United States Patent Office 2,986,836
Patented June 6, 1961

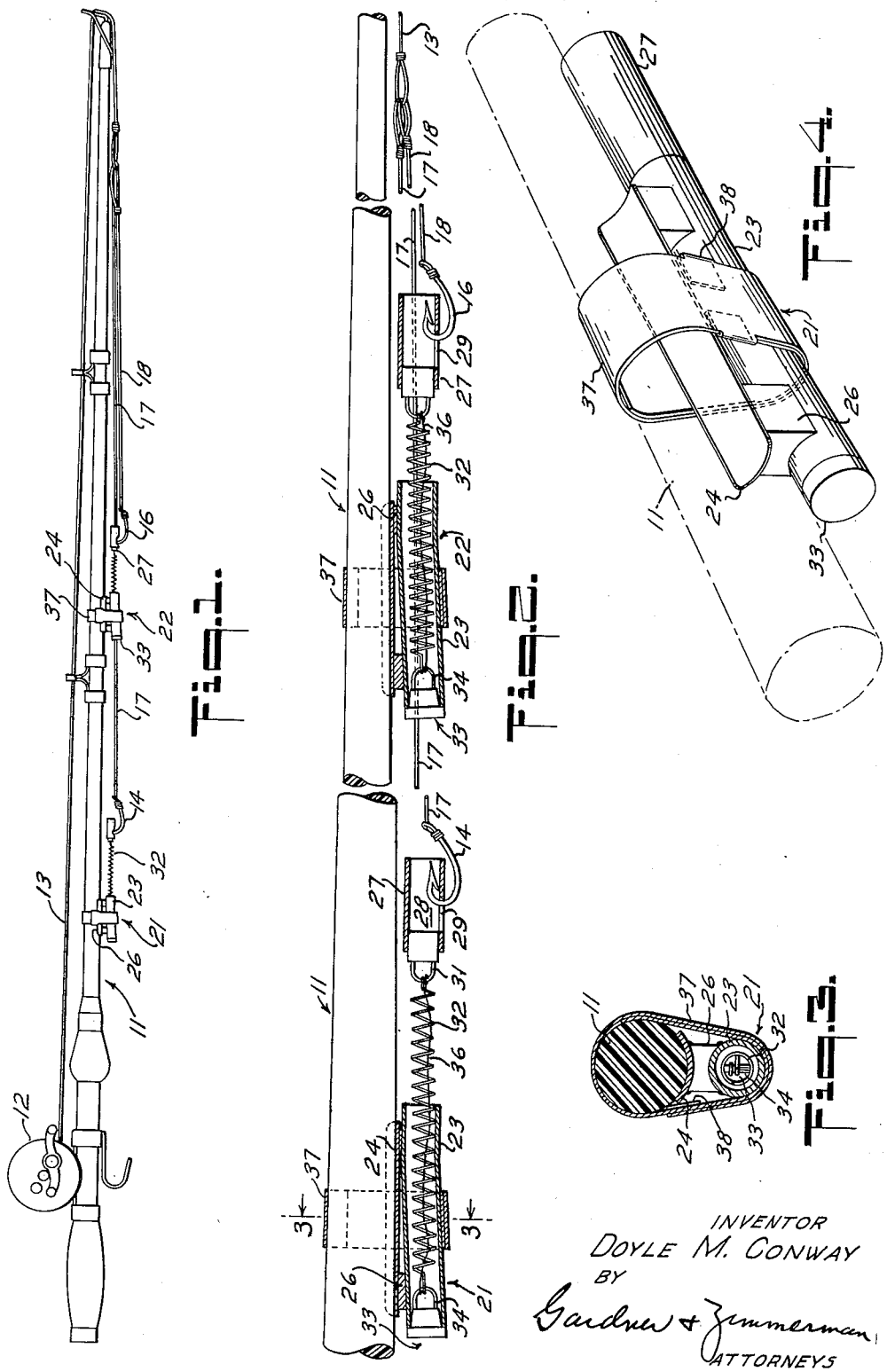
INVENTOR
DOYLE M. CONWAY

2,986,836
FISH HOOK MOUNT
Doyle M. Conway, 29219 Louis St., Hayward, Calif.
Filed Jan. 2, 1958, Ser. No. 706,697
4 Claims. (Cl. 43—25.2)

The present invention relates to means for safely and easily securing a plurality of fish hooks on a fishing line to a fishing pole or rod.

It is common practice when carrying or storing a fishing rod having a hook on the line thereof to catch the hook upon some protuberance on the rod and reel the line tight to hold the hook from falling loose. There are known various devices which may be affixed to a fishing rod and with which a hook may be engaged, so that upon reeling tight the line no sharp hook portion is exposed and the hook is firmly anchored by line tension. While known devices are advantageous in covering and retaining single fish hooks on a fishing rod, oftentimes two or more hooks in longitudinally spaced relation are tied by leaders to a single fishing line and the problem of retaining all of the hooks simultaneously and safely anchored on the rod is not solved by conventional devices. This is so because the plurality of fish hooks are tied by leaders of different lengths to a single line, so that the operation of reeling the line in, can only tighten one leader and attached hook onto conventional hook retaining means, leaving the remaining hooks hanging free and forming a serious safety hazard. It is of course theoretically possible to position two or more anchor points on the rods in the same spaced relation as the hooks on the lines, but this is impractical to accomplish for obvious reasons.

The present invention is adapted to provide mounting or anchoring means for a plurality of fish hooks spaced longitudinally on a single line whereby reeling in of the line anchors each hook in a secure position, regardless of the relative lengths of the separate hook leaders and their relationship to the spacing and positioning of the hook anchoring or retaining means on the rod. In this invention individual hook anchoring means or units are adapted for ready movement along a fishing rod, and yet automatic clamping thereto upon the application of pressure thereon from an engaged hook.

In part, the advantages of the present invention are obtained by providing for extendible connections between hook engaging members of the anchoring units and the place of attachment of the respective anchoring units to the rod. Preferably the extendible connections are in the form of coil springs, and in addition to the extendible connections the anchoring units are adjustably mounted on the rod so that the units may be spaced longitudinally on the rod to more or less approximate the corresponding spacing of the hooks with respect to the line. In this manner any variation in the spacing of the hooks as compared to the spacing of the units may be readily adjusted without requiring expansion of the springs beyond the limit of the capacity thereof. It will thus be clear that the relationship in the spacing between the hooks and the positioning of the anchoring units, as well as of the capacity of the springs, are important. It may be mentioned that so long as this general relationship in the spacing of the various parts is maintained, one of the anchoring units could be used without the extendible hook engaging member, however, this is not desirable since a relatively close correspondence in spacing of the units must be provided in respect to the spacing of the hooks, and also the capacity of the remaining extendible connection may be unduly taxed.

In accordance with the foregoing, it is an object of the present invention to provide means for mounting upon a fishing rod a plurality of hooks affixed to a line on the rod.

It is another object of the present invention to provide mounting means tensioning more than one hook on the line of a fishing rod by tightening of the line.

It is a further object of the present invention to provide fish hook mounting means readily positionable along a fishing rod and self-tightening thereon by line tension.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention, as set forth in the claims.

The invention is illustrated in the accompanying drawing, wherein:

FIGURE 1 is a side elevation of a fishing rod including the multi-hook mounting means of the present invention.

FIGURE 2 is an enlarged fragmental side elevation of the mounting means of FIG. 1 with portions thereof shown in section.

FIGURE 3 is a transverse sectional view taken at 3—3 of FIG. 2.

FIGURE 4 is a perspective view of one of the hook mounting means engaged with a rod, the latter being shown in phantom.

Considering now the present invention in greater detail as to the manner of construction and mode of operation, reference is made to FIGURE 1, wherein there is illustrated a conventional fishing rod 11 having a reel 12 thereon with a line 13 wound thereabout and extending the length of the rod through suitable guides including an end guide. To the line 13 there are connected a plurality of hooks, here shown two in number and designated 14 and 16. The hooks 14 and 16 are tied to the line by means of leaders 17 and 18 respectively, and as is common practice, these leaders are of unequal lengths. In the illustrated instance wherein two hooks are attached to the fishing line, two hook anchoring units or mounts 21 and 22 are provided upon the rod at positions spaced longitudinally thereon for engagement by the hooks, and the mounts are so constructed and arranged that as previously stated notwithstanding any variation in the distance between the hooks and that of the spacing between the two hook mounts, tightening of the line by the reel places each of the hooks in tension with its respective mount.

The two anchoring units or mounts are here shown of the same construction, and as best illustrated in Figure 2, each mount includes a hollow cylinder 23 affixed in longitudinal alignment upon an elongated arcuate-surfaced base 24 as by blocks 26 welded, soldered or otherwise secured thereto. The cylinder 23 is mounted in generally oblique relation to the base so as to be positioned closer thereto at the forward end of the mount as by the provision of different sized mounting blocks. The base has the concave side thereof disposed away from the cylinder and is adapted to fit upon the fishing rod 11 longitudinally thereof.

The mount is provided at the forward end thereof with a head 27 that may be cylindrical and formed with a rear extension of reduced diameter adapted to mate within the cylinder 23 and to rest therein on the shoulder so formed about the rear end of the head. Also, the head is provided with a generally longitudinal bore 28, which may extend through the front thereof and which has a side opening 29 through the head for receiving a fish hook 14. The head length from the side opening to the front thereof is greater than the curved-back length of a hook to be inserted therein so that as illustrated in FIGURE 2 when the hook is inserted in the head no sharp hook portion extends outside the head.

At the rear of the mount head 27 there is provided spring mounting means such as an eye 31, to which is secured a tension spring 32. This spring 32 extends through the cylinder 23 into connection with a rear plug 33 formed with a flanged back and an eye 34 on the front thereof engaging the spring. The rear plug has a frusto-conical section portion tapering forwardly from a base diameter slightly greater than the inner diameter of the cylinder 23 to dispose the base rearwardly and with the flange thereof adapted to extend over the cylinder end. The spring 32 has a normal length less than the space separating the head 27 and rear plug 33 when within the cylinder 23 so that the head and plug are normally held at each end of the cylinder in inserted relation thereto. The spring is sufficiently flexible to accommodate substantial extension thereof whereby the head may be drawn out of the cylinder against spring tension, as shown in FIGURE 2. Protection against over extension of the spring 32 is provided by a line 36 connected between the eyes 31 and 34, as shown, and having a length slightly less than the maximum resilient spring flexibility.

As to the attachment of each hook mount 21 to the fishing rod 11, there is provided for each mount a strap 37 adapted to extend about the rod and the associated hook mount cylinder. This strap 37 may be formed of thin metal that can be bent and is curved about the rod and cylinder, as shown in FIGURES 3 and 4, with retaining means such as tabs 38 thereon turned back over a double strap thickness to fix the strap configuration. As the cylinder 23 slants upon the base 24 thereof, it is thus also inclined longitudinally of the rod 11, and the strap 37 is formed to fit the outer surface of the rod and cylinder, as best seen in FIGURE 2. The strap thus provides a lesser opening at one end than at the other, and the small end is placed toward the end of the rod away from the reel thereon. In this manner as the mount 21 is pulled tightly within the strap in the direction of said end of the rod, the strap wil bind upon the rod to hold the mount in position.

Considering now the use of the improved hook mounting means of the present invention, the two mounts are positioned on the rod in spaced relation in general conformance with the difference in length of the leader lines or the spacing between the hooks, the straps 37 encircling the respective mounts. A hook 14 is then placed through the side opening 29 in the appropriate head with the point or barb thereof in the head bore 28. Tightening of the fishing line 13 by taking up on the reel 12 then causes the hook to pull the head 27 out of the cylinder 23 against the force of the spring 32. Locking of the reel then leaves the hook firmly anchored in the head 27 as the extended spring 32 pulls the head in a direction away from the hook. Also, the extension of the spring pulls the entire mount 21 toward the forward rod extremity to force the same tightly into the strap 37 and fix the mount in position. The second hook may then be engaged with the other mount, and the latter moved into gripping position with the rod in the same manner as with the first mount. If necessary further take on the reel may be effected to insure firm anchorage of the mounts. Additional mounts may be anchored to the rod by following the foregoing procedure.

Release of the hooks is readily accomplished by letting line out from the reel to remove the spring tension from the mounts and slipping the hooks from the mounts. As will be clear from FIGURE 2, the forward portion of each cylinder is bent outwardly so that its axis will be parallel with that of the rod. In this manner this spring may readily retract into the cylinder and the head 27 smoothly guided back into the cylinder. Loosening of the mounts on the rod after use thereof, as for repositioning, is easily accomplished by extending the head forward manually to stretch the spring and release the head whereby the same snaps back to strike the cylinder and jar it rearward out of the strap. The mount structure is directed to facilitating manufacture and assembly, as will be realized from the fact that both ends thereof are movable out of the cylinder. The spring and line are thus easily secured to both head and rear plug, and the tapered rear plug configuration tends to hold the plug within the cylinder, as is normally desired.

What is claimed is:

1. An improved fish hook mount for fishing rods comprising an elongated bas having an arcuate surface adapted to fit upon a rod longitudinally thereof, a hollow cylinder secured to said base and inclined longitudinally with respect thereto, a hollow head member having a side hook admitting opening intermediate the ends thereof and a plug cylindrical in form disposed in one end thereof, said plug having a rearward facing eye mounted thereon facing rearwardly of said hollow head member, an extensible spring disposed in said cylinder and connected between said eye and said cylinder to retain said hollow head member in close fit within the forward end of said cylinder and to apply tension on a fish hook engaged in said hook opening and attached to a fishing line strung on the rod, and a strap adapted to extend about said cylinder and a fishing rod to mount the former on the latter with the forward portion of the cylinder directed toward the forward end of the rod whereby resilient extension of said head binds said cylinder in said strap to fix the mount position upon the rod.

2. An improved fish hook mount for fishing rods comprising an elongated base having an arcuate surface adapted to fit upon a rod longitudinally thereof, a hollow cylinder secured to said base and having a front portion extending parallel to said fishing rod and a rear portion inclined thereto, a hollow head member having a side hook admitting opening intermediate the ends thereof and a plug cylindrical in form disposed in one end thereof, said plug having a rearward facing eye mounted thereon facing rearwardly of said hollow head member, an extensible spring disposed in said cylinder and connected between said eye and said cylinder to retain said hollow head member in close fit within the forward end of said cylinder and to apply tension on a fish hook engaged in said hook opening and attached to a fishing line strung on the rod, and a strap adapted to extend about said cylinder and a fishing rod to mount the former on the latter with the forward portion of the cylinder directed toward the forward end of the rod whereby resilient extension of said head binds said cylinder in said strap to fix the mount position upon the rod.

3. An improved fish hook mount for fishing rods comprising an elongated base having an arcuate surface adapted to fit upon a rod longitudinally thereof, a hollow cylinder secured to said base and inclined longitudinally with respect thereto, a hollow head member having a side hook admitting opening intermediate the ends thereof and a plug having an extension extending rearwardly from said hollow head member and adapted to fit within the forward end of said cylinder, said hollow head member and said cylinder having colinear outer surfaces when the rearward end of said hollow head member abuts against the forward end of said cylinder, said extension having a rearward facing eye mounted thereon, an extensible spring disposed in said cylinder and connected between said eye and said cylinder to retain said hollow head member in close fit within the forward end of said cylinder and to apply tension on a fish hook engaged in said hook opening and attached to a fishing line strung on the rod, and a strap adapted to extend about said cylinder and a fishing rod to mount the former on the latter with the forward portion of the cylinder directed toward the forward end of the rod whereby resilient extension of said head binds said cylinder in said strap to fix the mount position upon the rod.

4. An improved fish hook mount for fishing rods comprising an elongated base having an arcuate surface adapted to fit upon a rod longitudinally thereof, a hollow cylinder secured to said base and inclined longitudinally with respect thereto, said base including a forward mounting block and a rearward mounting block, the forward mounting block being lesser in thickness than the rearward block so as to incline at least a portion of the cylinder to the base, a hollow head member having a side hook admitting opening intermediate the ends thereof and a plug cylindrical in form disposed in one end thereof, said plug having a rearward facing eye mounted thereon facing rearwardly of said hollow head member, an extensible spring disposed in said cylinder and connected between said eye and said cylinder to retain said hollow head member in close fit within the forward end of said cylinder and to apply tension on a fish hook engaged in said hook opening and attached to a fishing line strung on the rod, and a strap adapted to extend about said cylinder and a fishing rod to mount the former on the latter with the forward portion of the cylinder directed toward the forward end of the rod whereby resilient extension of said head binds said cylinder in said strap to fix the mount position upon the rod.

References Cited in the file of this patent

UNITED STATES PATENTS

| | | |
|---|---|---|
| 155,266 | Sprague | Sept. 22, 1874 |
| 157,032 | Smith | Nov. 17, 1874 |
| 1,489,471 | Tilton | Apr. 8, 1924 |
| 1,516,682 | Peabody | Nov. 25, 1924 |
| 1,825,866 | Hieser et al. | Oct. 6, 1931 |
| 2,091,916 | Evans | Apr. 27, 1936 |
| 2,514,645 | Jardine | July 11, 1950 |
| 2,584,430 | Dayton et al. | Feb. 5, 1952 |
| 2,659,174 | Leach | Nov. 17, 1953 |
| 2,799,110 | Miller | July 16, 1957 |

FOREIGN PATENTS

| | | |
|---|---|---|
| 501,968 | Italy | Nov. 26, 1954 |
| 170,761 | Austria | Mar. 25, 1952 |